(12) United States Patent
Walston et al.

(10) Patent No.: US 9,025,507 B1
(45) Date of Patent: *May 5, 2015

(54) METHOD AND SYSTEM FOR FAST CHANNEL CHANGE IN A COMMUNICATION DEVICE

(75) Inventors: Allen Walston, Atlanta, GA (US); Carol Ansley, Alpharetta, GA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 180 days.

This patent is subject to a terminal disclaimer.

(21) Appl. No.: 13/194,560

(22) Filed: Jul. 29, 2011

Related U.S. Application Data

(63) Continuation of application No. 11/546,451, filed on Oct. 11, 2006, now Pat. No. 7,990,951.

(60) Provisional application No. 60/725,521, filed on Oct. 11, 2005.

(51) Int. Cl.
*H04H 20/71* (2008.01)
*H04N 21/438* (2011.01)
*H04N 21/6405* (2011.01)

(52) U.S. Cl.
CPC ....... *H04N 21/4384* (2013.01); *H04N 21/6405* (2013.01)

(58) Field of Classification Search
None
See application file for complete search history.

(56) References Cited

U.S. PATENT DOCUMENTS

| 5,477,263 | A  | * | 12/1995 | O'Callaghan et al. | 725/102 |
|---|---|---|---|---|---|
| 7,110,404 | B1 |   | 9/2006  | Temoshenko |  |
| 7,222,185 | B1 |   | 5/2007  | Day |  |
| 7,990,951 | B2 | * | 8/2011  | Walston et al. | 370/352 |
| 2002/0059619 | A1 | * | 5/2002 | Lebar | 725/87 |
| 2002/0115421 | A1 | * | 8/2002 | Shahar et al. | 455/403 |
| 2004/0107436 | A1 | * | 6/2004 | Ishizaki | 725/36 |
| 2004/0194147 | A1 |   | 9/2004 | Craven et al. |  |
| 2005/0002331 | A1 |   | 1/2005 | Nolle et al. |  |
| 2005/0232304 | A1 | * | 10/2005 | Quigley | 370/486 |
| 2006/0062200 | A1 |   | 3/2006 | Wang et al. |  |
| 2006/0075428 | A1 |   | 4/2006 | Farmer et al. |  |

\* cited by examiner

*Primary Examiner* — Kibrom T Hailu
*Assistant Examiner* — James P Duffy
(74) *Attorney, Agent, or Firm* — Troy A. Van Aacken

(57) ABSTRACT

An association table associates each program stream of a plurality of program streams with a MAC domain, with a channel frequency and with a multicast address. If a subscriber device selects a content program different from a current program, a determination is made whether the new program is serviced by a different MAC domain than the one serving the current program. If the selected new program is not serviced by the same domain that is serving the current program stream(s), the current MAC domain is informed that the subscriber device is ending the session therewith, the new frequency is tuned by the subscriber device and new content is received immediately after the new frequency is tuned. The subscriber device registers with the new MAC domain after receipt of new content has begun.

4 Claims, 1 Drawing Sheet

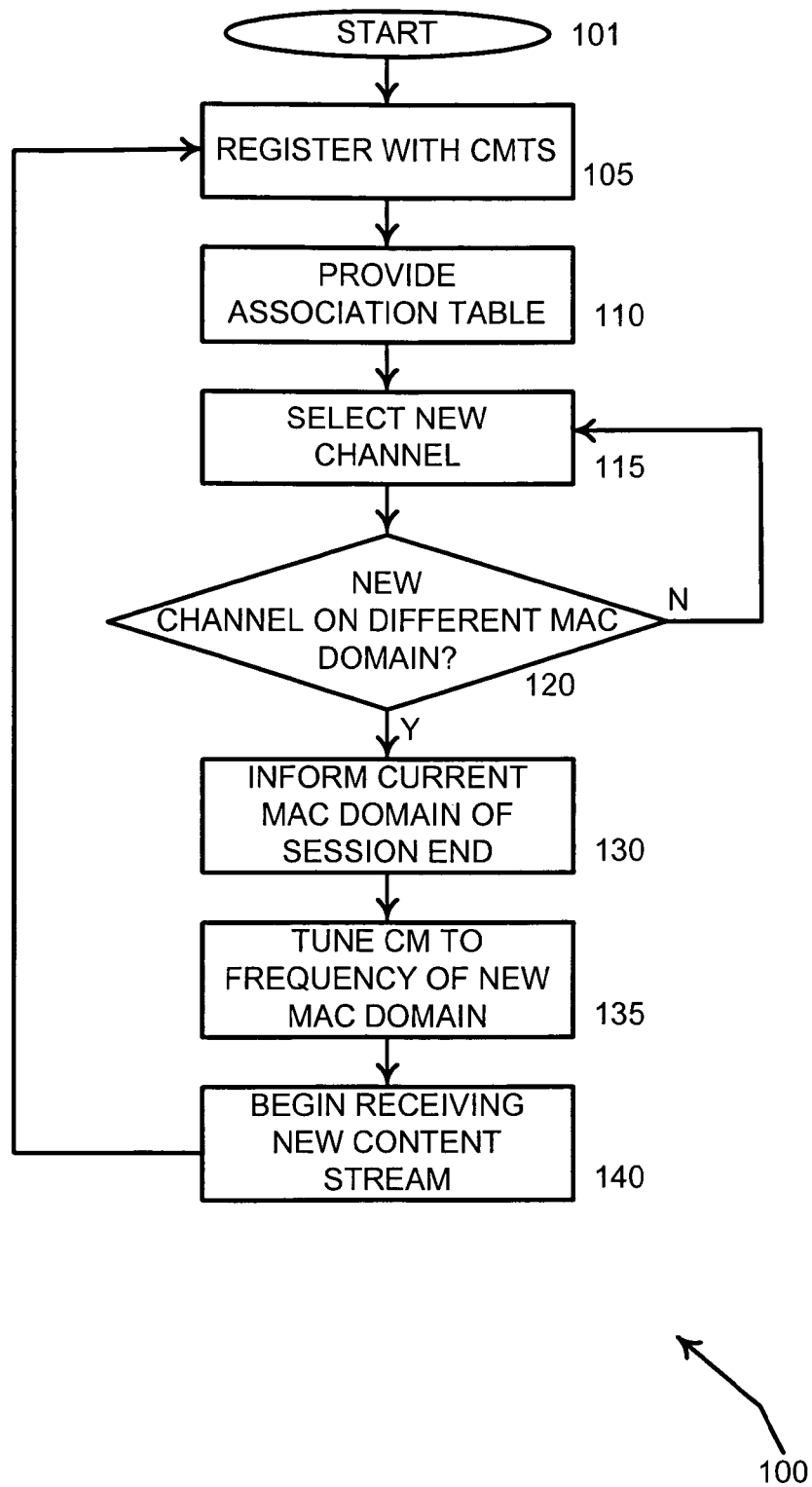

METHOD AND SYSTEM FOR FAST CHANNEL CHANGE IN A COMMUNICATION DEVICE

CROSS REFERENCE TO RELATED APPLICATION

This application priority under 35 U.S.C. 119(e) to U.S. provisional patent application No. 60/725,521 entitled "Method for fast switching of a DSG device," which was filed Oct. 11, 2005, and is incorporated herein by reference in its entirety.

FIELD OF THE INVENTION

The present invention relates generally to communication networks and devices, and more particularly to facilitating fast change between channels that are provided from different media access domains ("MAC") domains.

BACKGROUND

Community antenna television ("CATV") networks have been used for more then four decades to deliver television programming to a large number of subscribers. Increasingly, CATV networks are used by providers to provide data services to subscribers. For example, cable modems used in a broadband cable modem termination system ("CMTS") compete with digital subscriber lines ("DSL") and DSL modems used therein, which are typically implemented and supported by telephone companies. DSL service is typically provided over the same wires as a residence's telephone service.

In the cable distribution context, a CMTS typically transmits downstream data to a cable modem ("CM"). The data sent to a CM can include packets containing voice call information, interne data, or video content, for examples. In the scenario where video is transmitted downstream from the CMTS to a CM, multiple program streams may be served by multiple media access control ("MAC") domains. Different MAC domains may be located at the same service provider head end, or may be geographically spread amount multiple head end locations.

When a user is viewing a program and wishes to change to a different program, the user typically causes a set top box, or such similar subscriber device, to change to a different program identifier that corresponds to the new program the subscriber wishes to receive. If program streams corresponding to the newly selected program streams are serviced by, or delivered from, a different MAC domain than is delivering the currently viewed program, the subscriber device typically informs the current MAC domain that it is ending the session with the current MAC domain. Next, the subscriber device typically tunes to a frequency of a downstream channel over which the newly selected program is delivered. After tuning to the new channel, the subscriber device typically registers with the new MAC domain that services the newly selected program stream(s). The registering process can take a long time relative to the amount of time a user may be used to in changing television stations between two analog-delivered channels. This time delay can be annoying and tarnish a viewers experience in using his or television, or other similar video monitor device.

Thus, there is a need in the art for method for facilitating the changing of channels delivering different video content that reduces the amount of time between channel changes when the different program channels are served by different MAC domains.

BRIEF DESCRIPTION OF THE DRAWINGS

FIG. 1 illustrates a flow diagram of a method for facilitating fast channel change.

DETAILED DESCRIPTION

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. This disclosure is not intended nor is to be construed to limit the present invention or otherwise to exclude other embodiments, adaptations, variations, modifications and equivalent arrangements, the present invention being limited only by the claims appended hereto and the equivalents thereof.

Turning now to FIG. 1, a flow diagram of a method 100 for facilitating fast channel change is shown. Method 100 starts at step 101. A user/subscriber device, such as, for example, a cable modem ("CM") used to receive downstream video content from a cable modem termination system ("CMTS") registers at step 105 with the CMTS according to processes known in the art. The registration process 105 establishes a session between the downstream media access control ("MAC") domain of the CMTS and the CM. Registration provides the CMTS with information regarding the CM so bandwidth may be allocated properly to the CM and other CMs currently registered.

In an aspect, an association table is provided to the CM after registration at step 110. The association table may be generated at a service provider's head end, or another central location operated by the service provider. The latter may be preferable if multiple CMTSs spread across multiple physical locations are used to provide content to subscribers. The association table includes program identifiers that correspond to programs to which a subscriber/viewer may be granted access. The program identifiers are associated with downstream channel frequency. The downstream channel frequency is typically a center frequency of a QAM channel used to deliver data and multimedia content, as known in the art. In addition to being associated with a downstream channel frequency, a given program identifier is associated with a CMTS MAC domain identifier. The MAC identifier corresponds to the MAC domain of the CMTS device (e.g., CMTS blade) from which the given program is delivered. Furthermore, the program identifier is associated with a multicast address, such as an IP multicast address, that is unique to the program and its related packet streams. The association table may also associate a given program identifier with a downstream service identifier ("DSID") if DOCSIS 3.0 is used to deliver content to the subscriber.

While a subscriber/viewer is watching a video program, the association table resides in the CM for future use. If the viewer wants to watch different program, he or she may select a program using a familiar screen-based program guide. When the user selects a different program than the one currently being viewed, a new program identifier corresponding to the selected content is selected at step 115 at the CM device (a device that includes CM circuitry as well as other processing circuitry, which may be a set top box, or an IP television set top box). When the new program identifier is selected, a determination is made at step 120 whether a channel change will require terminating the current session between the CM and the CMTS and establishing a new session with a different MAC domain. If the determination result is that a new session does not need to be established, method 100 returns to step 115.

If, however, a determination is made at step 120 that the content selected by the user is not available from the MAC domain with which the CM device currently has an active session, method 100 follows the 'Y' path from step 120. At step 130, the CM informs the current MAC domain that the CM will terminate the current session. The CM terminates the current session by tuning to a new frequency at step 135. The new frequency to which the CM tunes at step 135 corresponds to the program identifier that is associated with the program identifier that was selected at step 115. It will be appreciated that since method 100 did not end following step 120, the new frequency is delivered from a different MAC domain.

As soon as the CM tunes to the downstream frequency that is associated with the selected program identifier in the association table, the CM device begins receiving the content corresponding to the program identifier selected by the subscriber at 115. Method 100 then returns to step 105 and the CM device registers with the new MAC domain. Since the process represented by registration step 105 may take a few seconds, the subscriber/viewer has already started receiving—and viewing—the selected before registration is completed. Accordingly, fast channel change, i.e., reduced time between selecting a new program and viewing the selected new program—is facilitated.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

What is claimed is:

1. A method for facilitating changing the receiving of program streams at a subscriber communication device, comprising:
    receiving an association table for a plurality of program streams at a subscriber device, each program stream being associated with a bonded group of channels in a given MAC domain, and having an identifier, wherein each bonded group is associated with one or more downstream channels having a channel frequency and a multicast address;
    receiving a request to change to a different program from a current program at the subscriber device;
    determining from the association table at the subscriber device whether the different program is delivered from a new MAC domain comprising a second bonded group different from a current MAC domain comprising a first bonded group associated with the current program;
    sending a message to a current MAC domain associated with the first bonded group that the subscriber device is ending the current session with the first bonded group within the current MAC domain;
    tuning the subscriber device to the second bonded group comprising one or more downstream channels associated with a channel carrying the different program;
    and receiving streams comprising the different program from the tuned second bonded group comprising one or more downstream channels based on the identifier associated in the association table with the different requested program;
    and registering with the new MAC domain comprising the second bonded group that services the newly selected program streams after the stream packets of the newly selected program have begun.

2. The method of claim 1 wherein the association table associates each program stream with a downstream identifier used in DOCSIS 3.0.

3. A method for facilitating changing the receiving of program streams at a subscriber communication device, comprising:
    generating an association table that associates each program stream of a plurality of program streams with a MAC domain, with a channel frequency and with a multicast address;
    receiving a request to change to a different program from a current program; and
    determining from the association table whether the requested program is delivered from a different MAC domain than the current program;
    sending a message to a current MAC domain associated with a first bonded group that the subscriber device is ending the current session therewith;
    tuning the subscriber device to a second bonded group associated with a channel carrying a newly selected program;
    receiving streams of the newly selected program associated with the second bonded group; and
    registering with a new MAC domain associated with the second bonded group that services the newly selected program streams after the stream packets of the newly selected program have begun.

4. A method for facilitating changing the receiving of program streams at a subscriber communication device, comprising:
    generating an association table for a plurality of program streams, the association table associating each program stream with a MAC domain comprising a bonded group of channels in the MAC domain, wherein each bonded group is associated with one or more downstream channel frequencies and a multicast address;
    receiving a request to change to a different program from a current program;
    determining from the association table whether the requested different program is delivered from a new MAC domain comprising a second bonded group different from a current MAC domain comprising a first bonded group associated with the current program;
    sending a message to the current MAC domain that the subscriber device is ending the current session with the first bonded group within the current MAC domain;
    tuning the subscriber device to the second bonded group associated in the association table with a channel carrying the requested different program;
    receiving the requested different program corresponding to the second bonded group based on the multicast address associated in the association table with the requested different program; and
    registering with the new MAC domain comprising the second bonded group including the requested different program after receiving stream packets corresponding to the requested different program.

* * * * *